United States Patent [19]

Albrecht

[11] Patent Number: 4,909,708
[45] Date of Patent: Mar. 20, 1990

[54] VANE ASSEMBLY FOR A GAS TURBINE

[75] Inventor: Günter Albrecht, Feedgeding, Fed. Rep. of Germany

[73] Assignee: MTU Motoren- und Turbinen- Union Munchen GmbH, Fed. Rep. of Germany

[21] Appl. No.: 268,981

[22] Filed: Nov. 9, 1988

[30] Foreign Application Priority Data

Nov. 12, 1987 [DE] Fed. Rep. of Germany ....... 3738439

[51] Int. Cl.⁴ .............................................. F04D 29/56
[52] U.S. Cl. .................................. 415/208.1; 415/116; 415/135
[58] Field of Search ............... 415/115, 116, 134, 135, 415/136, 137, 138, 139, 183, 191, 208.1, 182.1

[56] References Cited

U.S. PATENT DOCUMENTS

| 3,520,635 | 7/1970 | Killmann et al. | 415/138 |
| 4,305,696 | 12/1981 | Pask | 415/191 |
| 4,512,158 | 4/1985 | Striebel et al. | 415/DIG. 1 |
| 4,721,434 | 1/1988 | Marshall et al. | 415/191 |

FOREIGN PATENT DOCUMENTS

| 719061 | 11/1954 | United Kingdom | 415/191 |
| 751908 | 7/1956 | United Kingdom . | |
| 2034415 | 6/1980 | United Kingdom | 415/135 |
| 2154669 | 9/1985 | United Kingdom | 415/115 |

OTHER PUBLICATIONS

European patent, Jan. 1988, EP. 253, 994.
PCT WO82/01033, Apr. 1982.
PCT WO87/06981, Nov. 1987.

Primary Examiner—Robert E. Garrett
Assistant Examiner—John T. Kwon
Attorney, Agent, or Firm—Barnes & Thornburg

[57] ABSTRACT

A nozzle vane assembly for a gas turbine exhibits a number of circumferentially spaced vanes connected to a shroud. A second, concentric shroud is arranged separately and urged axially against the unrestrained ends of the vanes through a spring loaded clamping device. This arrangement serves to alleviate thermal stresses and thermal fatigue in the vane assembly.

14 Claims, 3 Drawing Sheets

VANE ASSEMBLY FOR A GAS TURBINE

BACKGROUND AND SUMMARY OF THE INVENTION invention relates to a vane assembly for a gas turbine engine of the type having concentrically arranged inner and outer shrouds with circumferentially spaced vanes therebetween.

Vane assemblies are needed in gas turbine engine compressors and turbines to ensure optimum inlet flow of the working fluid to the rotor blades. It is especially the vane assembly of the first uurbine stage directly downstream of the combustion chamber which comes under high thermal load on account of the elevated temperature and pressure. This is why the vane assembly must either come in a correspondingly heat-resistant material (ceramic) or be kept at low temperature by means of a cooling medium (air).

Vane assemblies of this description are either fully integral (single-piece) constructions or are joined together from single vanes or twin or triplet vane segments. While the latter construction involves high manufacturing costs plus considerable cooling-air leakage losses, these disadvantages are essentially eliminated when the vane assembly is manufactured as a fully integral component. Such vane assemblies are nevertheless encumbered by other disadvantages. For example, they come under high thermal fatigue loads induced by high radial and tangential temperature gradients. Difficulties are also encountered when incorporating small cooling air holes and when coating the components with hot gas corrosion-resistant surface layers and thermal barrier coatings.

A broad object of the present invention is to provide a vane assembly for a gas turbine which utilizes the advantages afforded by fully integral construction of low-cost manufacture and moderate leakage flows while avoiding its disadvantages, especially the high thermal fatigue.

This object is achieved according to the present invention by providing an arrangement wherein the other shroud is arranged separately and is capable of translation, and wherein an axial force is exerted on one of the two shrouds to urge the separately arranged shroud and axially chamfered tips of the vanes against each other by means of a clamping device lodging against one of an outer engine casing and inner turbine casing.

An important advantage provided by the present invention is that the vanes of the vaneaassembly are allowed to expand to suit the radial temperature profile and that the stresses that heretofore had occurred as a result of differing thermal expansions of vanes and inner or outer shroud are prevented. The vanes are allowed to radially expand in the absence of stresses, the expansion being kinematically balanced by the translation of the separately arranged shroud to continue the contact between the two components.

In a further aspect of preferred embodiments of the present invention the vanes an the fixedly connected shroud can be manufactured as an integral component to give simplicity in manufacture and achieve a nonleaking design.

In further certain preferred embodiments of the present invention the vanes can be fixedly connected to the outer or inner shroud as will suit the deiign of the flow passage or the combustion chamber. It will also be possible to arrange the clamping device such that the separate shroud is urged against the stationary vanes, or inversely that the separate shroud is fixedly connected to the casing while the clamping force is exerted on the shroud fitted with the vanes.

In certain preferred embodiments of the present invention the outer shroud is arranged separately. This provides an advantage especially in small gas turbine engines with reverse-flow combustion chambers, considering that the outer shroud here exhibits a more pronouncedly conical contour than the inner shroud. Should peculiarities of design give the inner shroud a more pronouncedly conical contour than the outer shroud, alternative use can be made of the embodiment featuring a separate inner shroud.

In certain preferred embodiments of the present invention the points of contact between the unrestrained ends of the vanes and the separate shroud are provided in the leading edge area of the vanes, for the reason that this is where larger contact and pressurefaces derive from the prevailing greater thickness of vane.

In certain preferred embodiments of the present invention a narrow radial clearance is provided in the vane trailing edge area between the vanes and the unrestrained shroud to permit temperature induced radial expansion of the vanes, so that in operation, contact at this point is avoided altogether or that contact forces, if arising, are kept small.

In certain preferred embodiments of the present invention aerodynamic losses are alleviated by ventilating the clearance with air taken from the chamber extending radially outside the outer shroud and admitted through holes. In an alternative or additional arrangement a portion of the stator cascade cooling air can be blown off.

In certain Preferred embodiments of the present invention the vane ends in the clearance area are suitably designed to reduce the flow around the vane ends.

In certain preferred embodiments of the prevent invention, wear protective coatings are deposited on the vane ends and/or the separate shroud to prevent fretting at the contact points.

Other objects, advantages and novel features of the present invention will become apparent from the following detailed description of the invention when considered in conjunction with the accompanying drawings.

DETAILED DESCRIPTION OF HE INVENTION

Figure 1:
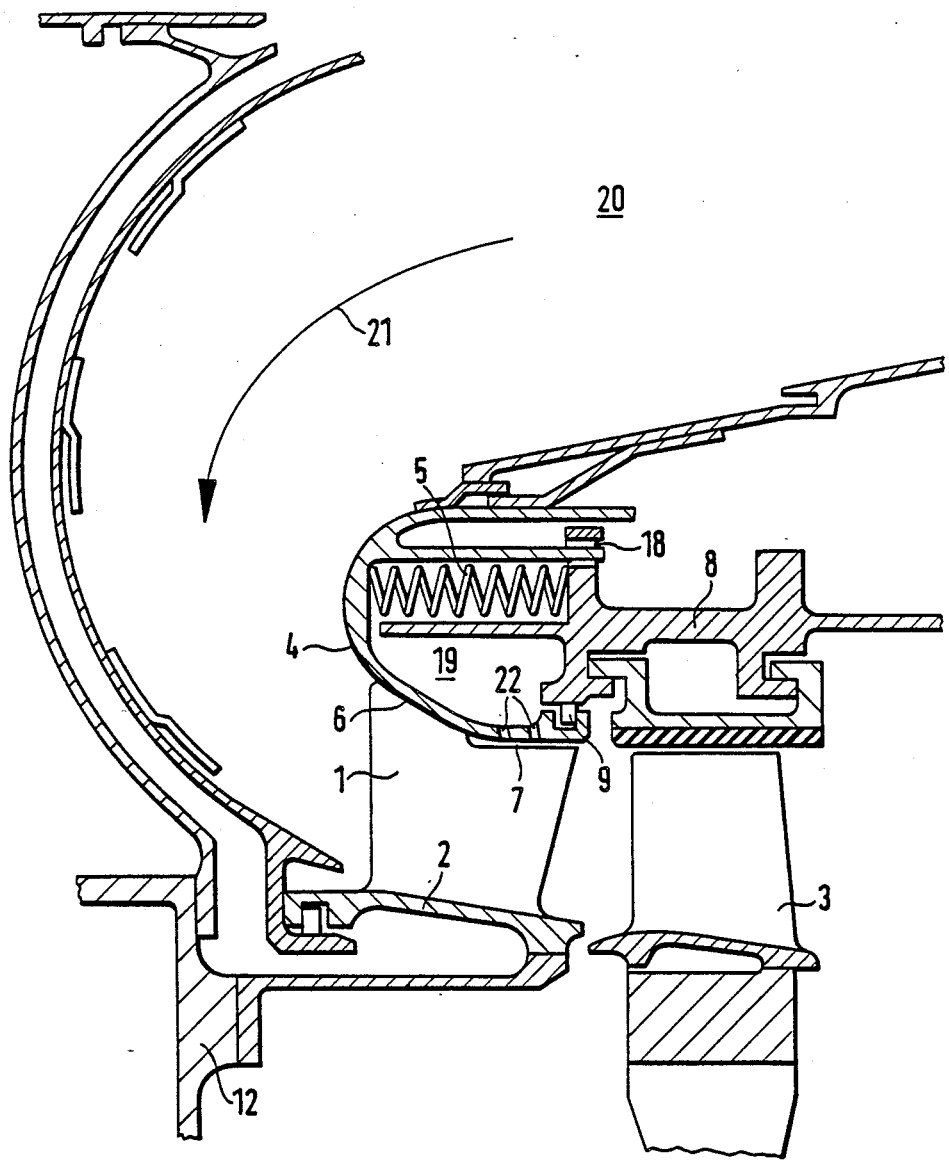
FIG. 1 is an axial sectional schematic view of a portion of a gas turbine engine with a reverse flow combustion chamber and a turbinestage consisting of a vane assembly and a rotor, constructed in accordance with a preferred embodiment of the invention.

With reference now to FIG. 1 a vane 1 is radially arranged between an inner shroud 2 and an outer shroud 4. The vane 1 is fixedly connected to the inner shroud 2, with the inner shroud 2 in turn being attached to the inner casing 12 of the gas turbine.

The separate outer shroud 4 is connected to the engine casing 8 through a lamping device 5 taking the shape of a compression spring and allowing for translation of the outer shroud 4. Linear bearings 18 serve to axially guide the outer shroud 4 in the engine casing 8 and more particularly to prevent circumferential rotation. A circumferential seal 9 is provided to prevent gases from escaping from the flow passage and entering the chamber 19.

In gas tubbine operation, heated compressed working gas from the combustion chamber 2 flows in the direction indicated by arrow 21 to energize the vanes 1 that are spaced over the circumference of the inner shroud 2. In the process the gas stream is deflected circumferentially to impinge on the downstream turbine rotor blades 3 with a minimum of loss. Further downstream the gas strea impinges on the nozzle vanes and rotor blades of further turbine stages, which are omitted on the drawing.

The depicted vane 1 touches the separate outer shroud 4 not along the entire tip of the vane, but only in a forward partial area 6. In this area the vane 1 is chamfered and the oppositely arranged outer shroud 4 has a conical shape to ensure axial contact pressure between these two components In the rear portion of the vane tip a radial clearance 7 is provided to permit thermally induced radial expansion of the vane 1. The radial clearance 7 communicateswwith the chamber 19 through holes 22, permitting air to escape to reduce the aerodynamic losses in the radial gap 7.

Figure 2:
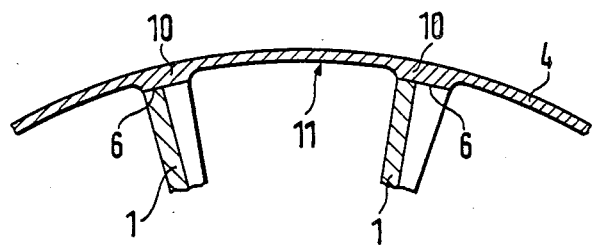
FIG. 2 is a enlarged cross-sectional view illustrating an outer shroud section of the construction of FIG. 1.

FIG. 2 is a selective enlargemnnt in cross-sectional view of the separate outer shroud44. Two circumferentially spaced vanes 1 are arranged radially inward from the outer shroud 4, which in the areas 10 has thicker wall sections at the points of contact 6 with the vanes 1. In the intermediate areas 11 the wall thickness is reduced to produce a more flexible action of the entire outer shroud 4 than could be ahhieved with uniform wall thicknes.

Figure 3:
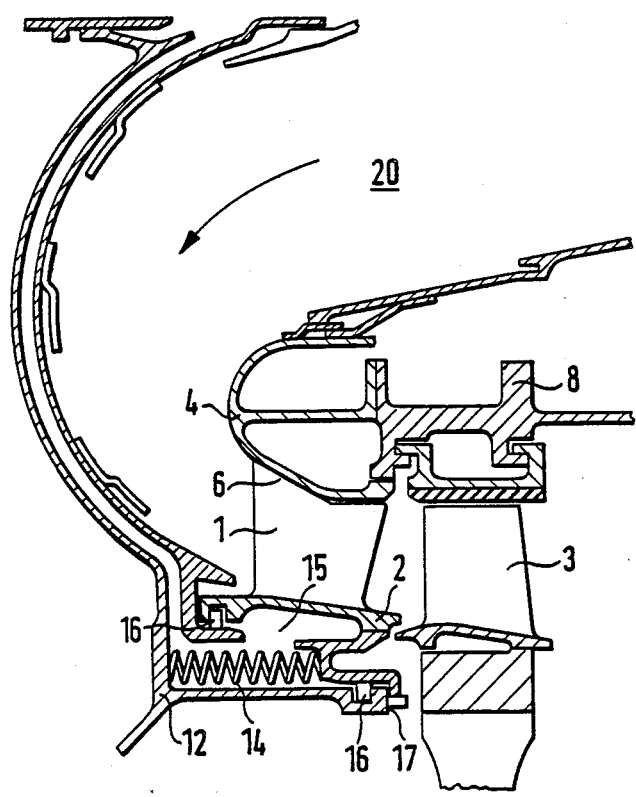
FIG. 3 is ar axial sectional schematic view of a portion of a gas turbine engine with a reverse flow combustion chamber and a turbine stage consisting of vane assembly and a rotor, constructed in accordance with another preferred embodiment of the invention

In the embodiment of the present invention illustrated in FIG. 3 the separate outer shroud 4 is fixedly arranged in the engine casing 8. The inner shroud 2 connected to the vanes 1, however, permits of translation in the inner engine casing 12. In this arrangement a clamping device 14 is provided to produce the clamping force at the point 6 of contact between the vane 1 and the separate outer shroud 4. A linear bearing 17 arranged between the inner engine casing 12 and the inner shroud 2 makes for accurate translation of the inner shroud 2. A seal 16 is provided to prevent the aggressive combustion gases from escaping from the flow passage and entering the chamber 15.

Figure 3A:
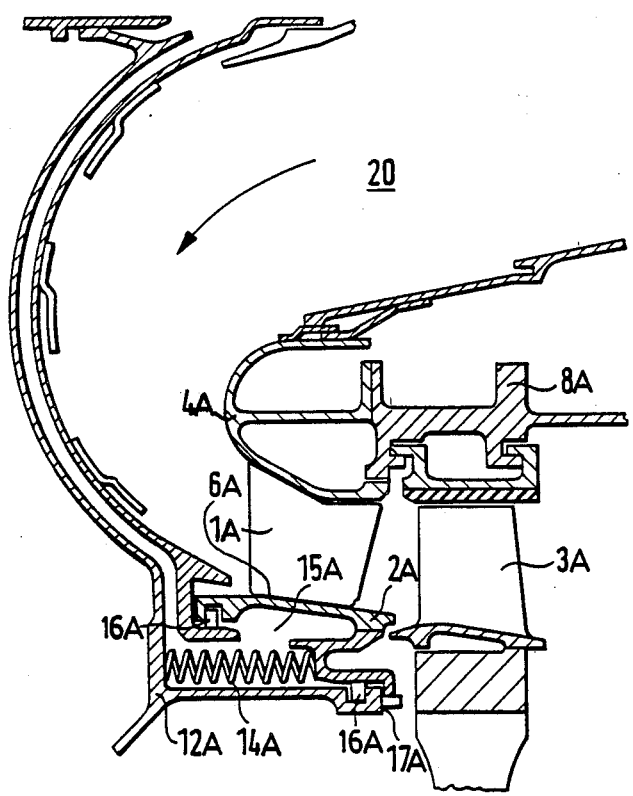
FIG. 3A is a view similar to FIG. 3 showing a modified embodiment of the invention.

The FIG. 3A embodiment differs from the FIG. 3 embodiment only in that the vanes 1A are affixed to the outer shroud 4A and the contact point 6A is between the inner shroud 2A and the inner tips of the vanes 1A. Similar reference characters, with a postscript "A", as in FIG. 3 are used for similar structure as in FIG. 3.

Although the present invention has been described and illustrated in detail, it is to be clearly understood that the same is by way of illustration and example only, and is not to be taken by way of limitation. The spirit and scopeoof the present invention are to be limited only by the terms of the appended claims.

WHAT IS CLAIMED IS:

1. Vane assembly for gas turbine, having an inner shroud, a concentrically arranged outer shroud, and circumferentially spaced vanes between thm, said vanes being attached to one of the two shrouds, wherein the other shroud is arranged separately and is capable of translation, and wherein an axial force is exerted on one of the two shrouds to urge the separately arranged shroud and axially chamfered tips of the vanes against each other by means of a clamping device lodging against one of an outer engine casing and inner engine casing.

2. Vane assembly according to claim 1, wherein the vanes are fixedly connected to the inner shroud and the clamping device is arranged between the outer shroud and the outer engine casing.

3. Vane assembly according to claim 2, wherein the points of contact between the unrestrained ends of the vanes and the separate shroud are provided in a leading edge area of the vanes.

4. Vane assembly according to claim 3, wherein the separate shroud has a thicker wall in the areas of the contact points.

5. Vane assembly according to claim 1, wherein the vanes are fixedly connected to the inner shroud and the clamping device is arranged between the inner shroud and the inner engine casing.

6. Vane assembly according to claim 5, wherein the points of contact between the unrestrained ends of the aanes and the separate srroud are provided in a leading edge area of the vanes.

7. Vane assembly according to claim 6, wherein the separate shroud has a thicker wall in the areas of the contact points.

8. Vane assembly according to claim 1, wherein the vanes are fixedly connected to the outer shroud.

9. Vane assembly according to claim 1, wherein the points of contact between the unrestrained ends of the vanes and the separate shroud are provided in a leading edge area of the vanes.

10. Vane assembly according to claim 9, wherein a narrow radial clearance is provided in the vane trailing edge area between the vanes and the unrestrained shroud.

11. Vane assembly according to claim 10, wherein the radial clearance is ventilated with air from a chamber through holes in the separate shroud.

12. Vane assembly according to claim 11, wherein means are provided to blow off a portion of the vane cooling air in the radial clearance.

13. Vane assembly according to claim 1, wherein the shroud connected to the clamping device has guide means to prevent rotation in a circumferential direction.

14. Vane assembly according to claim 1, wherein the separate shroud has a thicker wall in the areas of the contact points.

* * * * *